United States Patent
Yoshikawa et al.

(10) Patent No.: US 7,911,411 B2
(45) Date of Patent: Mar. 22, 2011

(54) PROJECTION APPARATUS

(75) Inventors: Tsutomu Yoshikawa, Daito (JP); Yusuke Ohta, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 819 days.

(21) Appl. No.: 11/716,938

(22) Filed: Mar. 12, 2007

(65) Prior Publication Data
US 2007/0216879 A1 Sep. 20, 2007

(30) Foreign Application Priority Data
Mar. 15, 2006 (JP) .................. 2006-071212

(51) Int. Cl.
G09G 3/00 (2006.01)
G03B 21/28 (2006.01)

(52) U.S. Cl. .......................... 345/32; 353/77

(58) Field of Classification Search .................. 345/32, 345/30; 353/20, 72, 73, 77; 359/212.1, 214.1
See application file for complete search history.

(56) References Cited

U.S. PATENT DOCUMENTS
| | | | |
|---|---|---|---|
| 2003/0053787 A1 | 3/2003 | Lee |
| 2004/0090598 A1 | 5/2004 | Morinaga |
| 2005/0140937 A1 | 6/2005 | Kumai |
| 2006/0028838 A1 | 2/2006 | Imade |

FOREIGN PATENT DOCUMENTS
JP 2000-155373 6/2000

OTHER PUBLICATIONS

European Search Report for European Application No. 07005163.6-1240, dated Jul. 23, 2007 (6 pages).
Patent Abstracts of Japan for Publication No. 2000-155373, Publication date Jun. 6, 2000 (1 page).

*Primary Examiner* — Srilakshmi K Kumar
(74) *Attorney, Agent, or Firm* — Osha Liang LLP (57) ABSTRACT

A projection apparatus for inexpensively adjusting the irradiating region of light on an image forming device to irradiate the light to the entire image forming surface of the image forming device is provided.

The projector including a light tunnel for passing the light emitted from a lamp and changing the light to condensed uniform light, a mirror for reflecting the light passed through the light tunnel, a DMD for reflecting the light at an image forming surface irradiated with the light reflected by the mirror and forming an image, a lens for projecting the image formed with the DMD, and a frame for attaching these components of an image projection optical system; further includes a rotation adjustment fixing mechanism for fixing the light tunnel to the frame with the rotation angle having the axis of the light tunnel as substantially the center adjusted with an incident port of light of the light tunnel facing the lamp and an exit port facing the mirror.

3 Claims, 13 Drawing Sheets

PRIOR ART

US 7,911,411 B2

PROJECTION APPARATUS

BACKGROUND OF THE INVENTION

1. Field of the Invention

The present invention relates to projection apparatus that employ image forming devices such as DMD (Digital Micromirror Device), in particular, to a configuration of adjusting an irradiating region for irradiating the light from a light source to the image forming device.

2. Description of the Related Art

Figure 1:
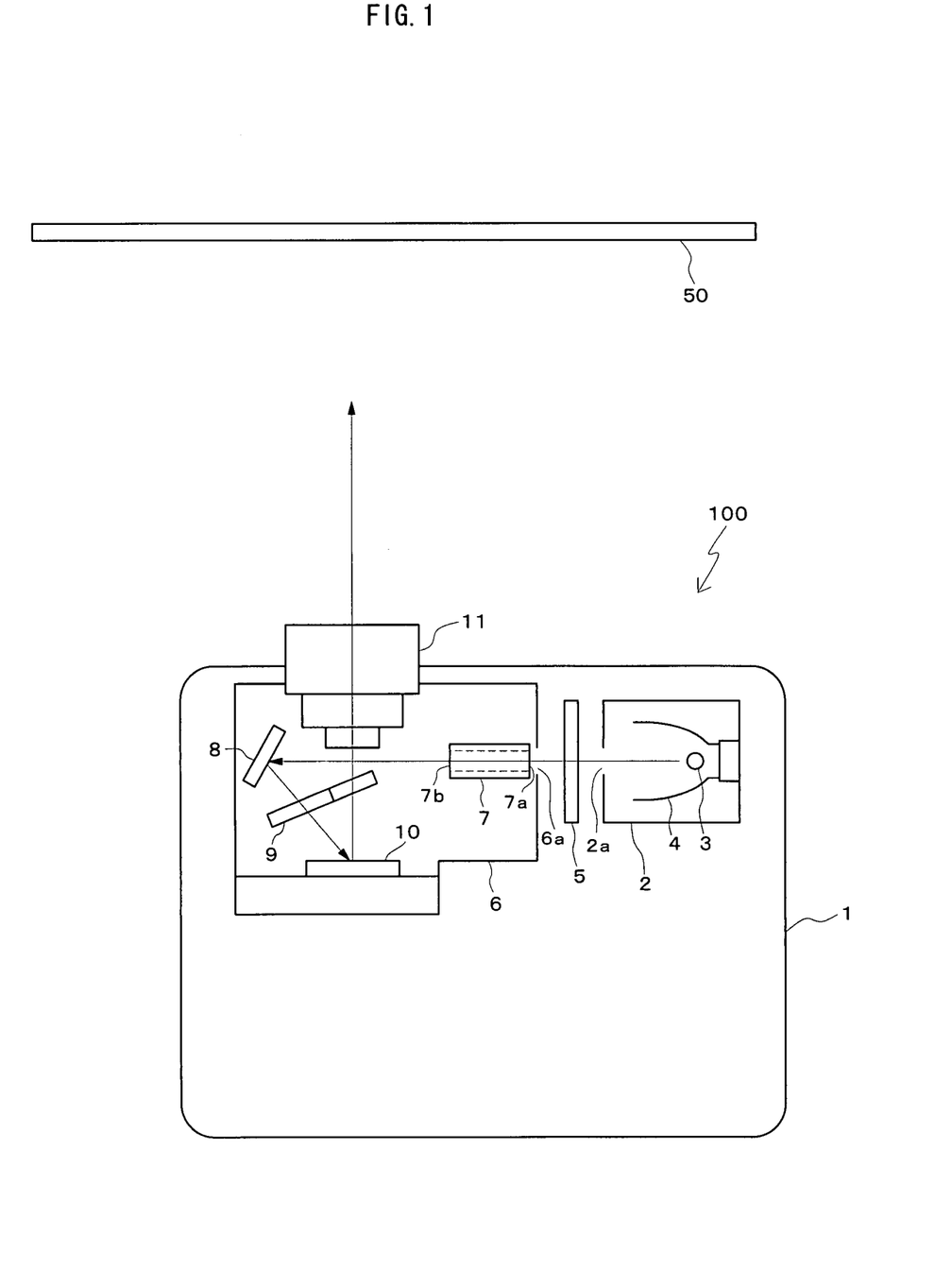
FIG. 1 is a configuration view of a projector serving as one example of a projection apparatus according to the present invention.

FIG. 1 is a view showing a schematic configuration of a projector 100 of DLP (Digital Light Processing) type. The projector 100 is one example of the projection apparatus. An illustrated image projection optical system unit is arranged inside the main body 1 of the projector 100. An air conditioning system unit, a controlling system unit, a power supply system unit etc. (not shown) are also arranged inside the main body 1.

Reference numeral 3 is a lamp serving as a light source, 4 is a reflector, and 2 is a lamp case for holding the lamp 3 and the reflector 4. Reference numeral 5 is a color wheel made of circular disc in which the color filters of red, green and blue are alternately arranged in the circumferential direction. The color wheel 5 that is rotated by a motor (not shown) transmits the white light emitted from the lamp 3 through one of the color filters, and separates the white light to red light, green light and blue light. Reference numeral 6 is an engine casting or a vertically separable frame made of magnesium. Components 7 to 11 of the image projection optical system described below are respectively assembled to the engine casting 6. Reference numeral 7 is a light tunnel of square tube shape having a mirrored inner surface. The light entered from an incident port 7a, which is an opening on one end side, is repeatedly reflected in the inside of the light tunnel 7, and exit from an exit port 7b, which is an opening on the other end side, thereby changing the light to a condensed uniform light in a short light path. Reference numeral 8 is a mirror for reflecting the light that has passed through the light tunnel 7. The light path length is shortened and the image projection optical system is miniaturized through the use of the light tunnel 7 and the mirror 8. Reference numeral 9 is a relay lens for aligning the light flux of the light reflected by the mirror 8.

Reference numeral 10 is a DMD (Digital Micro-mirror Device) in which several hundred thousand microscopic micro-mirrors (not shown) are integrated on a semiconductor memory, where each micro-mirror assigned with the memory cell configures the pixel. The DMD 10 is one example of the image forming device and is mounted on a circuit board (not shown) The micro-mirror of the DMD 10 that can be tilted in two directions at ±12° tilts to one direction by the electrostatic attraction force according to the memory value, and takes a binary state of ON/OFF depending on the tilted direction. Reference numeral 11 is a projection lens made up of a tube that is compressible in the axis direction, and a plurality of lenses etc. equipped inside of the tube. The projection lens 11 passes the light reflected by the DMD 10 and projects the light onto the screen 50.

As shown with an arrow, the white light emitted from the lamp 3 is passed through the opening 2a of the lamp case 2, passed through one of the color filters of the color wheel 5, and separated to the red light, green light and blue light. Each color light enters the inside through the opening 6a of the engine casting 6, and passes through the light tunnel 7 to be condensed and uniformed. The light exit from the light tunnel 7 is passed through the lower side of the projection lens 11, reflected upward at a predetermined angle by the mirror 8, passed through the relay lens 9, and irradiated onto the DMD 10. In this case, when the micro-mirror of the DMD 10 is in the ON state, the light reflected by the mirror is taken into the projection lens 11 and projected onto the screen 50. When the micro-mirror is in the OFF state, the light reflected by the mirror is not taken into the projection lens 11, and thus is not projected onto the screen 50. That is, the projector 100 forms the image with the DMD 10 by ON/OFF controlling the operation state of each micro-mirror of the DMD 10 based on the input video signal and the like, and projects the image onto the screen 50 through the projection lens 11.

Figure 14:
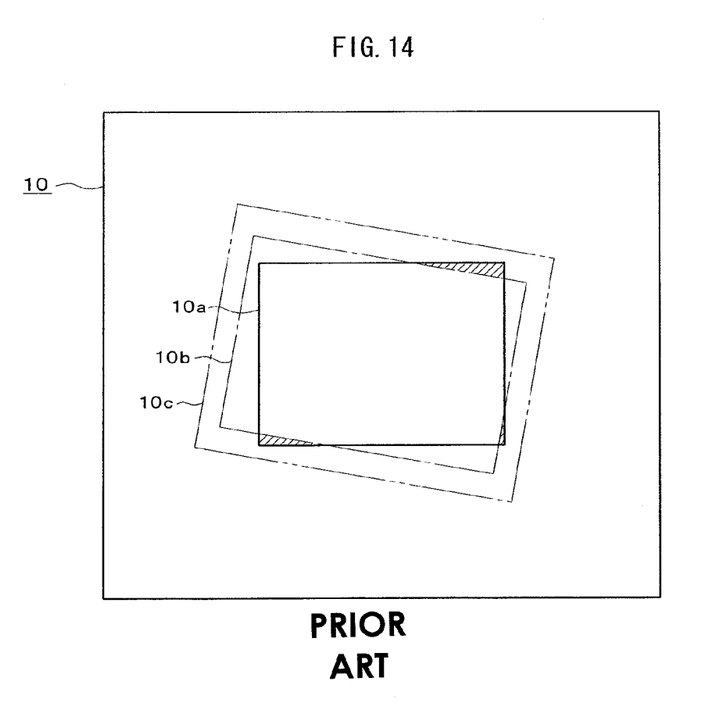
FIG. 14 is a view showing an irradiating state of the light on a DMD in prior art.

FIG. 14 is a view showing a conventional irradiating state of the light on the DMD 10. Rectangle 10a shown with a solid line is the image forming surface of the DMD 10 arranged on the side to be irradiated with light. The image forming surface 10a consists of above-described micro-mirrors. The light emitted from the lamp 3 is passed through the light tunnel 7 and the like, reflected by the mirror 8, and irradiated onto the DMD 10, as described above. In this case, the light is narrowed according to the diameter of the light tunnel 7 of square tube shape, and the light path is bent by the reflection at the mirror 8, and thus the irradiating region of the light irradiated on the DMD 10 becomes a square shape tilted (sometimes deformed) with respect to the image forming surface 10a as shown with 10b in a dot-dash line in FIG. 14, and the light may not be irradiated to one part, as indicated by the shaded area, of the image forming surface 10a. If the image is formed with the DMD 10 and projected onto the screen 50 in this state, the image quality may degrade such as the projected image may become dark.

Therefore, the attachment angle and position of the mirror 8 with respect to the engine casting 6 have been adjusted in the prior art to adjust the irradiating region of the light on the DMD 10 so that light is irradiated to the entire image forming surface 10a. Furthermore, the irradiating region of the light on the DMD 10 sometimes cannot be adequately adjusted so that light is irradiated on the entire image forming surface 10a only by adjusting the attachment of the mirror 8, in which case, the size of the diameter of the light tunnel 7 is changed to larger size, which enlarges the irradiating region of the light to 10c, as shown with a dot-dot-dash line in FIG. 14, in the prior art. However, the optical specification must be changed if the size of the light tunnel 7 is changed, which leads to adverse effects such as lowering in energy of the light per unit area to be irradiated on the DMD 10, and re-designing etc. of the image projection optical system may become necessary, which is very troublesome. Furthermore, various light tunnels 7 of different sizes must be manufactured and prepared, which is very costly.

Patent document 1; Japanese Patent Application Laid-Open No. 2000-155373 discloses a technique of adjusting the image displaying position on the screen by arranging a motor for rotating the projection lens with the optical axis as the center, a motor for operating a zoom mechanism of the projection lens, and a motor for moving a liquid crystal panel, DMD etc. in the X direction perpendicular to the optical axis and the Y direction in a rear projection television etc., and operating each motor through switch operation. However, such technique is difficult to apply to the adjustment of the irradiating region of the light on the DMD 10, and is also costly since a great number of motors and switches are used.

SUMMARY OF THE INVENTION

The present invention, in view of solving the above problems, aims to provide a projection apparatus for inexpensively adjusting the irradiating region of the light on the image forming device to irradiate the light to the entire image forming surface of the image forming device.

The present invention relates to a projection apparatus including a light tunnel for passing light emitted from a light source and changing the light to condensed uniform light, a mirror for reflecting the light passed through the light tunnel, an image forming device for reflecting the light at an image forming surface irradiated with the light reflected by the mirror and forming an image, a lens for projecting the image formed with the image forming device, and a frame for attaching these components of an image projection optical system; the apparatus further including a rotation adjustment fixing mechanism for fixing the light tunnel to the frame with the rotation angle adjusted with the incident port of light of the light tunnel facing the light source and the exit port facing the mirror.

Accordingly, the irradiating region of the light on the image forming device can be adjusted with a change of tilt or position by adjusting the rotation angle of the light tunnel by means of the rotation adjustment fixing mechanism, whereby the light can be irradiated to the entire image forming surface of the image forming device. As a result, the image quality can be prevented from degrading such as the projected image from becoming dark when the image formed with the image forming device is projected by the lens. Furthermore, the optical specification is not changed since the size of the light tunnel does not need to be changed as in the prior art, and thus the trouble of redesigning image projection optical system, and the cost for preparing the light tunnel of different sizes etc. can be saved.

In the present invention, the rotation adjustment fixing mechanism is configured by a base having the light tunnel fixed at one surface side at the center by means of a fixture and the other surface side rotatably supported at a supporting part formed in the frame with the incident port of light of the light tunnel facing the light source and the exit port facing the mirror; a pin, passed through a hole formed at one end of the base in a direction perpendicular to the axis of the light tunnel and attached to the frame, for supporting the one end swingably; a spring for biasing the one end of the base towards the supporting part of the frame; a screw, passed through a hole formed on the other end of the base in a direction perpendicular to the axis of the light tunnel and screwed into a screw hole formed in the frame, for pressing the other end towards the supporting part of the frame with a head; and a vis, screwed into a screw hole formed in the base to pass through the base and engaged to an inclined surface formed in the frame so as to incline in the axial direction of the light tunnel, for pressing the base against the side wall of the frame in the axial direction of the light tunnel.

In such configuration, when the base fixed with the light tunnel by the fixture is supported at the supporting part of the frame, the pin is passed through the hole at one end of the base and attached to the frame, and the one end of the base is biased towards the supporting part with a spring, the base rotates and the other end rises from the frame with respect to the one end, and the base is held by the frame. If the screw is passed through the hole on the other end of the base and screwed into the screw hole of the frame in such state, the other end of the base is pressed towards the supporting part side of the frame with the head of the screw, and the base gradually rotates. Thus, the rotation angle of the light tunnel is adjusted with the base by changing the screw-fit depth of the screw with respect to the screw hole of the frame. When the vis is screwed into the screw hole of the base and engaged to the inclined surface of the frame, a force acting towards the supporting part side is applied to the inclined surface of the frame from the vis, and a force acting towards the side wall side of the frame is applied to the vis from the inclined surface of the frame as reactive force, whereby the other end of the base is pressed against the side wall of the frame, and the base and the light tunnel are fixed to the frame without shaking in the axial direction and the rotating direction. Therefore, the rotation angle of the light tunnel is easily adjusted with a tightening task of screw, vis and the like, whereby the irradiating region of the light on the image forming surface is adjusted and the light can be irradiated to the entire image forming surface of the image forming device. Furthermore, the optical specification is not changed since the size of the light tunnel does not need to be changed as in the prior art, and thus the trouble and cost can be saved.

In the present invention, the spring contacts one surface of the base and presses one end towards the supporting part of the frame, and an inclined surface is formed at the area contacting the spring of the base so as to incline in a direction opposite the inclined surface of the frame.

According to this, the one end of the base is biased towards the supporting part side and the side wall side of the frame since the inclined surface of the base is pressed by the spring, whereby the base and the light tunnel are more reliably fixed to the frame without shaking in the axial direction and the rotating direction.

Furthermore, in a typical embodiment of the present invention, a projection apparatus includes a light tunnel of square tube shape for passing light emitted from a light source and changing the light to condensed uniform light, a mirror for reflecting the light passed through the light tunnel, a DMD (Digital Micro-mirror Device) for reflecting the light at an image forming surface irradiated with the light reflected by the mirror and forming an image, a lens for projecting the image formed with the DMD, and a frame for attaching these components of an image projection optical system; the projection apparatus further including a rotation adjustment fixing mechanism configured by, base having the light tunnel fixed at one surface side at the center by means of a fixture and the other surface side rotatably supported with the axis of the light tunnel as substantially the center at a supporting part formed in the frame with an incident port of light of the light tunnel facing the light source and an exit port facing the mirror; a plurality of pins, each passed through a plurality of holes formed at one end of the base in a direction perpendicular to the axis of the light tunnel and attached to the frame, for supporting the one end swingably; a spring, arranged around each pin, for pressing an inclined surface formed so as to incline in the axial direction of the light tunnel around each hole of the base towards the supporting part side of the frame; a screw, passed through a hole formed on the other end of the base in a direction perpendicular to the axis of the light tunnel and screwed into a screw hole formed in the frame, for pressing the other end towards the supporting part of the frame with a head; and a vis, screwed into a screw hole formed in the other end of the base to be passed through the base and engaged to an inclined surface formed in the frame so that an inclined part formed at the distal end inclines in the direction opposite the inclined surface of the base, for pressing the base against the side wall of the frame in the axial direction of the light tunnel; the rotation adjustment fixing mechanism fixing the light tunnel to the frame with the rotation angle having the axis of the light tunnel as substantially the center adjusted with the whole base by changing the screw-fit depth of the screw with respect to the screw hole of the frame, and screwing the vis into the screw hole of the base to engage the inclined surface of the frame.

In such configuration, when the base fixed with the light tunnel by the fixture is supported at the supporting part of the frame, and each pin, around which the spring is arranged, is passed through each hole at one end of the base and attached to the frame, each spring contacts the inclined surface around each hole of the base, and forces acting toward the supporting part and the side wall of the frame are applied to the inclined surface, whereby the base rotates with the axis of the light tunnel as substantially the center, the other end rises from the frame with respect to the one end, the one end moves towards the side wall side and the side wall of each hole at the one end is pressed against the side surface of each pin. In this state, the one end of the base is held at a plurality of points by a plurality of pins, a plurality of springs, and the frame, and thus shake of the base is suppressed, and subsequent attachment work is facilitated. The screw is then passed through the hole of the other end of the base and screwed into the screw hole of the frame, whereby the other end of the base is pressed against the supporting part side of the frame with the head of the screw, and the base gradually rotates with the axis of the light tunnel as substantially the center. Thus, the rotation angle of the light tunnel is adjusted with the base by changing the screw-fit depth of the screw with respect to the screw hole of the frame. In this state, the shake in the rotating direction of the base and the light tunnel is suppressed since the base is supported from both surfaces by the springs, the screws and the frame, and subsequent attachment work is facilitated. When the vis is screwed into the screw hole of the other end of the base, the inclined part at the distal end of the vis smoothly engages the inclined surface of the frame, whereby a force acting towards the supporting part side is applied to the inclined surface of the frame from the inclined part of the vis and a force acting towards the side wall side of the frame is applied to the inclined part of the vis from the inclined surface of the frame as reactive force. Thus, the base is thereby moved towards the side wall side of the frame and pushed against thereto, and the base and the light tunnel are fixed to the frame without shaking in the axial direction and the rotating direction. In this state, the base is supported by the springs, the screws, the vis, and the frame, and thus the shake in the axial direction and the rotating direction of the base and the light tunnel is almost completely suppressed, and a stable fixed state can be maintained.

Therefore, the rotation angle of the light tunnel is easily adjusted by the tightening task of the screw, vis and the like, whereby the irradiating region of the light on the DMD is adjusted and the light can be irradiated to the entire image forming surface of the DMD. In particular, if the rotation angle of the light tunnel is adjusted and the attachment of the mirror is adjusted, the adjustable range of the irradiating region of the light on the DMD is extended, and the light is more reliably irradiated to the entire image forming surface of the DMD. As a result, the image quality is prevented from degrading such as the projected image from becoming dark when the image formed with the DMD is projected by the lens. The optical specification is not changed since the size of the light tunnel does not need to be changed as in the prior art, and thus the trouble and cost can be saved. Moreover, the adjustment of the irradiating region of the light on the DMD is appropriately performed even if the same type of light tunnel is used indifferent types of projection apparatus, thereby standardizing the components, and further reducing the cost.

According to the present invention, the irradiating region of the light on the image forming device is adjusted by adjusting the rotation angel of the light tunnel by means of the rotation adjustment fixing mechanism, and the light can be irradiated on the entire image forming surface of the image forming device, and furthermore, the trouble and cost are saved since the size of the light tunnel does not need to be changed.

DESCRIPTION OF THE PREFERRED EMBODIMENTS

The embodiments of the present invention will now be described with reference to the drawings. The schematic configuration of the projection apparatus according to the embodiment of the present invention is similar to that of FIG. 1 described in the Background of the Invention section, and thus FIG. 1 will be cited for the embodiment of the present invention, and redundant description will be omitted. The projector 100 shown in FIG. 1 is one example of the projection apparatus according to the embodiment of the present invention.

Figure 2:
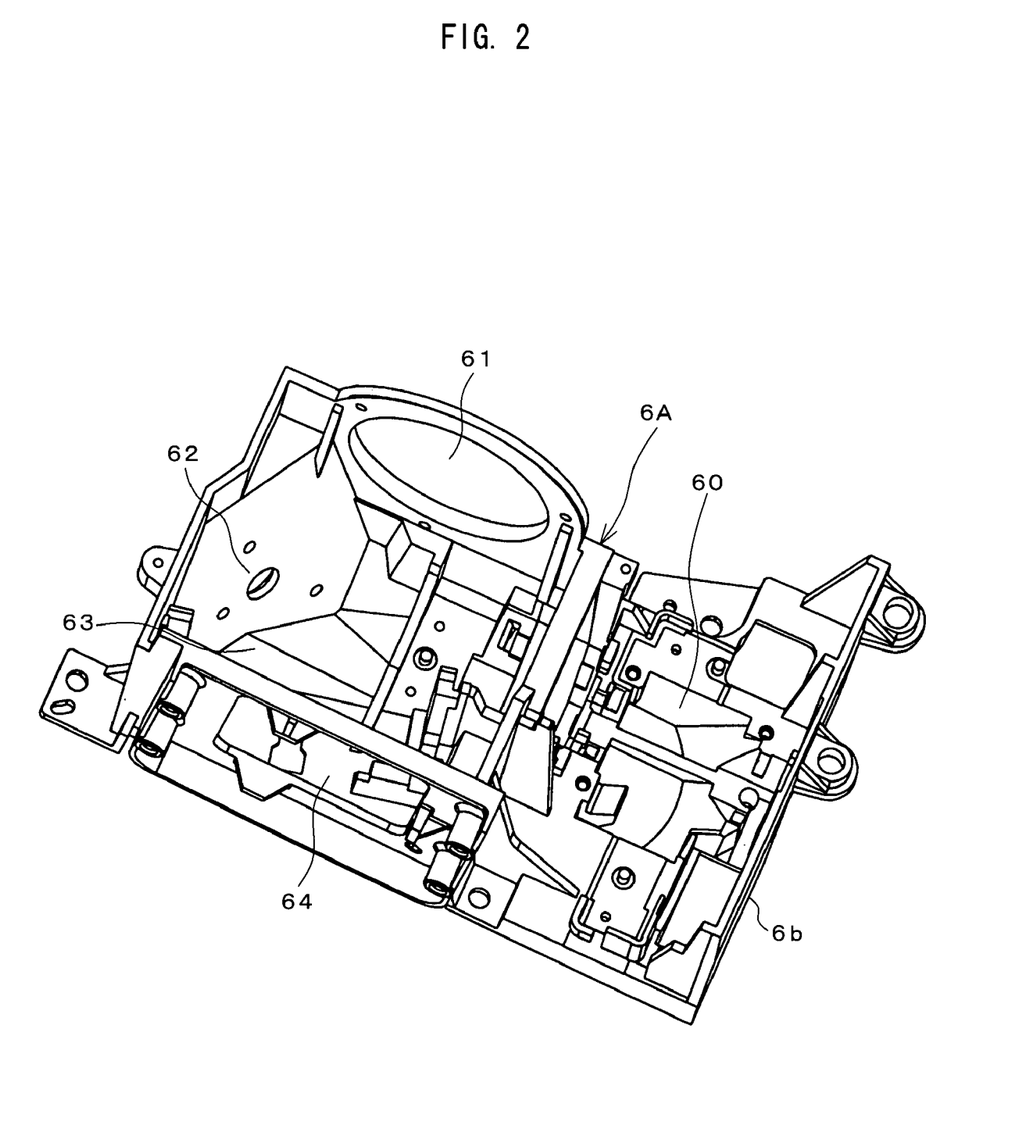
FIG. 2 is a perspective view of a lower side frame in the projector.

FIG. 2 is a perspective view showing a lower side frame 6A of the engine casting 6. The engine casting 6 is assembled by fitting the lower side frame 6A and an upper side frame (not shown) and tightening the frames with a screw and the like. The lower side frame 6A is integrally formed with an assembling part 61 for assembling the projection lens 11; an assembling part 62 for assembling the mirror 8; an assembling part 63 for assembling the relay lens 9; an assembling part 64 for assembling the DMD 10, a circuit board (not shown) mounted with the DMD 10, and a heat sink (not shown) for cooling the DMD 10; and an assembling part 60 for assembling the assembling component 20 including the light tunnel 7 shown in FIG. 4. The assembling part 60 and the assembling component 20 are main components of a rotation adjustment fixing mechanism in the present embodiment. Screw, vis, spring and the like are used to assemble each component of the image projection optical system to each assembling part 60 to 64.

Figure 4:
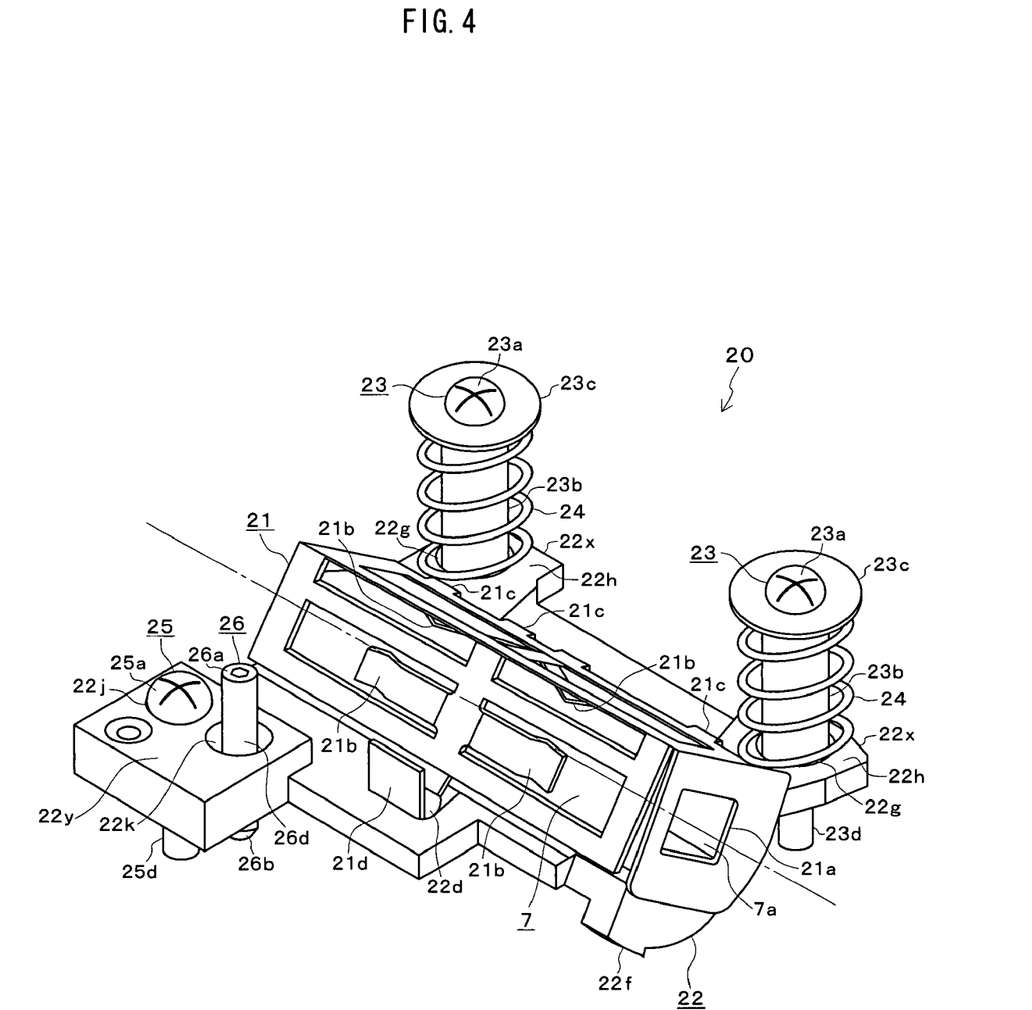
FIG. 4 is a perspective view of assembling components including a light tunnel.
Figure 10A:
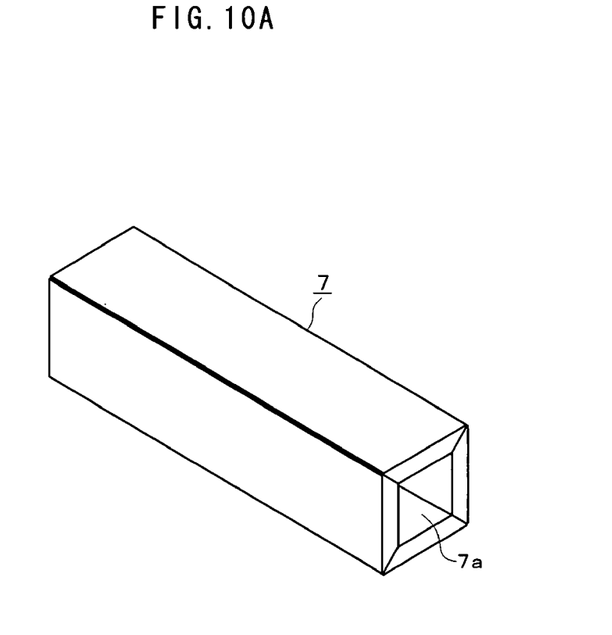
FIG. 10 is a perspective view of the light tunnel.
Figure 10B:
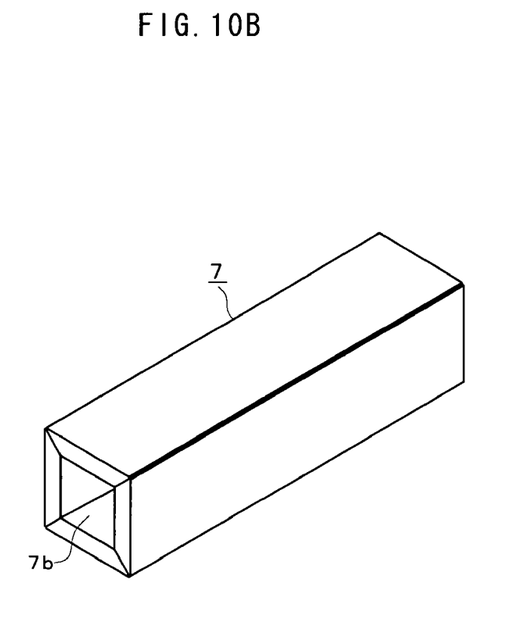
Figure 11A:
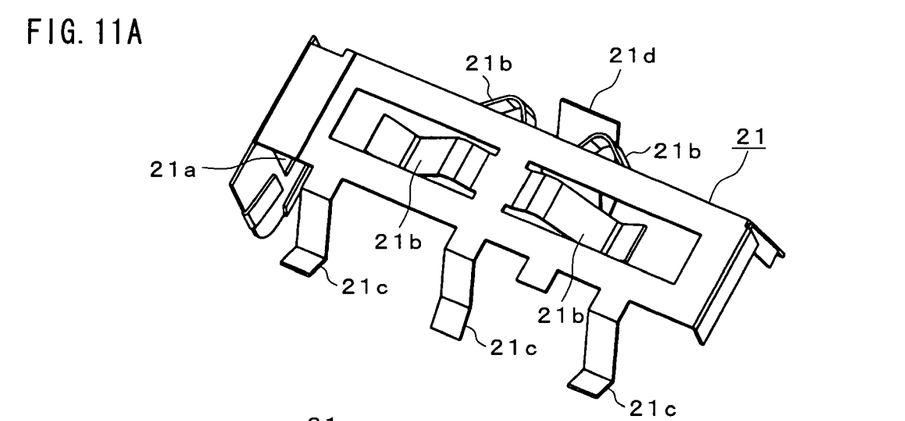
FIG. 11 is a perspective view of a fixture.
Figure 11B:
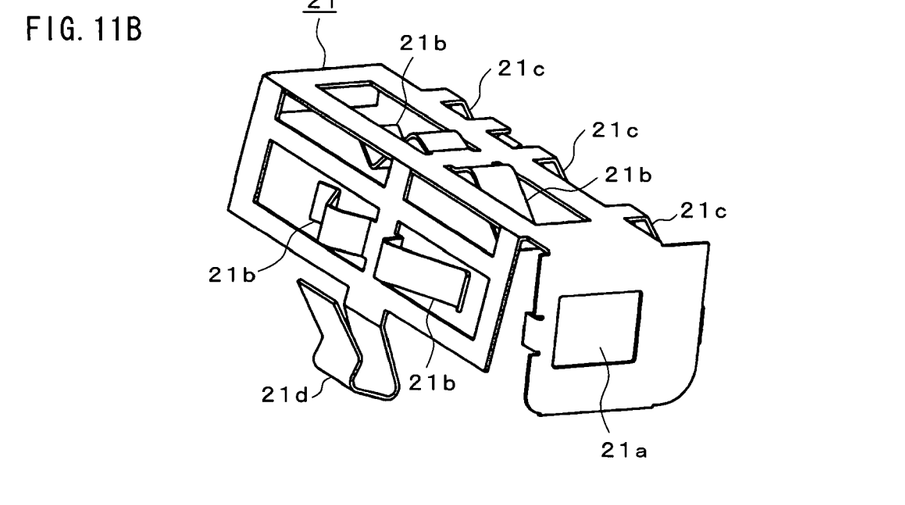
Figure 11C:
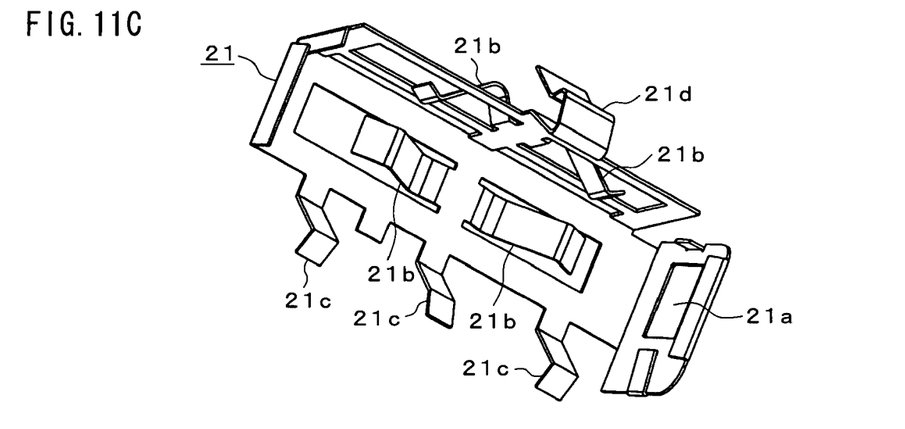

The assembling component 20 is configured by the light tunnel 7, fixture 21, base 22, pin 23, coil spring 24, round machine screw with cross-shaped groove 25, and screw 26 with a hexagonal hole, as shown in FIG. 4. The light tunnel 7 has a square tube shape as shown in FIG. 10, and has a mirrored inner surface. In FIG. 10A, a state in which the light tunnel 7 is viewed diagonally from the incident port 7a side is shown. In FIG. 10B, a state viewed diagonally from the exit port 7b side is shown. The fixture 21 is formed by bending a sheet metal, as shown in FIG. 11A to FIG. 1C. In FIG. 11A, a state in which the fixture 21 is viewed diagonally from above is shown. In FIG. 11B, a state viewed diagonally from the side is shown. In FIG. 11C, a state viewed diagonally from below is shown. An opening 21a is formed on the front surface of the fixture 21, as shown in FIG. 11B. The opening 21a has the same size as the incident port 7a, the exit port 7b, and the inner diameter of the light tunnel 7. Pressing parts 21b are formed at the center of each side surface of rectangular shape having a large width, and hook parts 21c, 21d are formed at the ends.

Figure 8A:
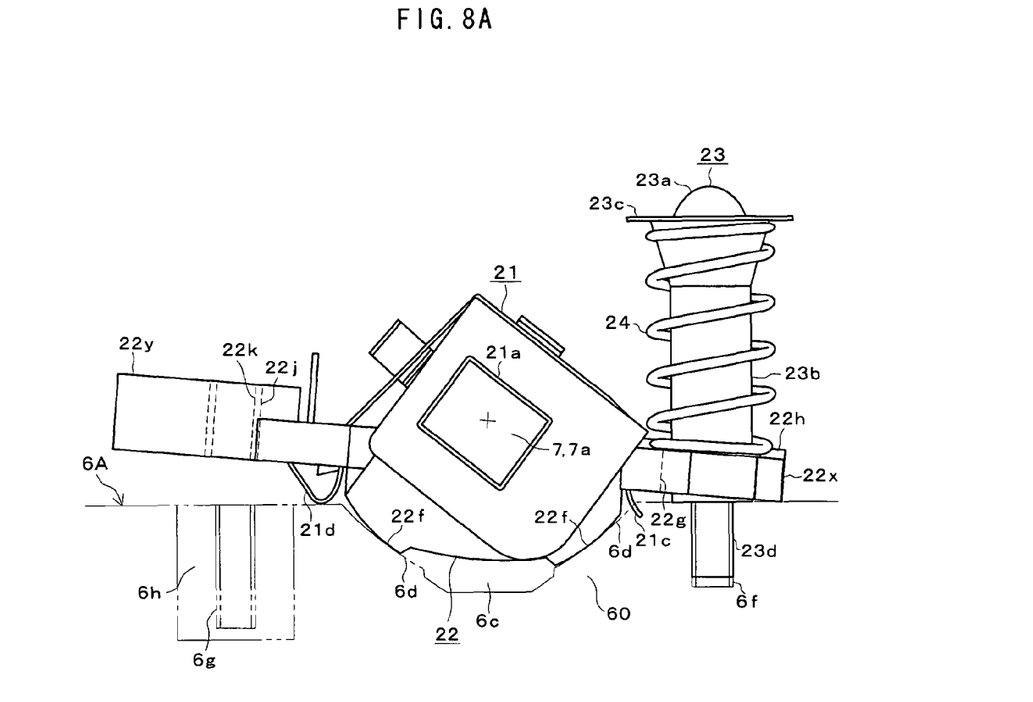
FIG. 8 is a view showing the attachment state of the assembling component with respect to the lower side frame.
Figure 8B:
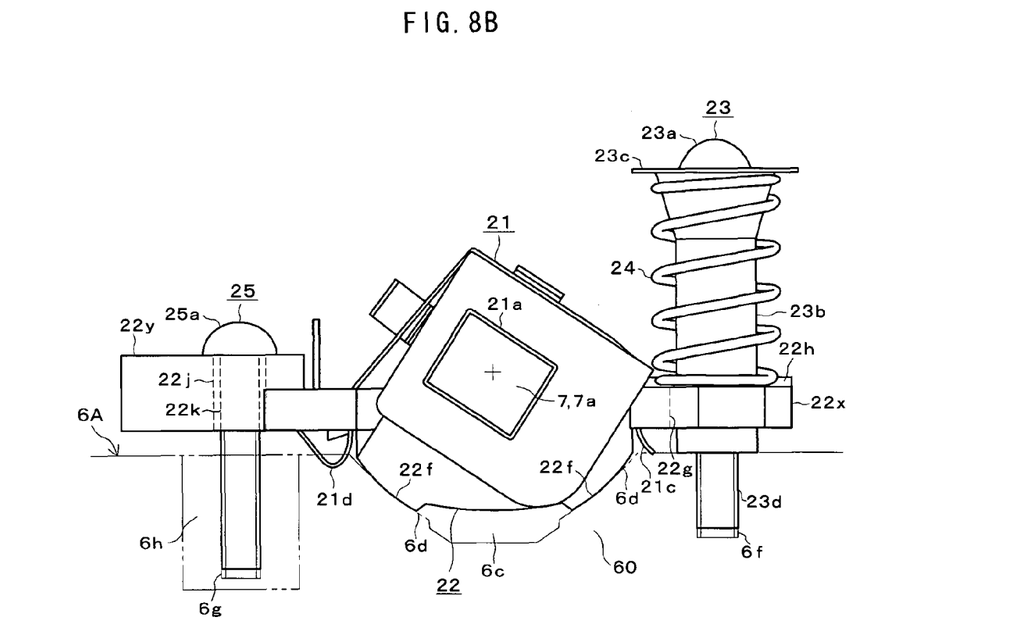
Figure 12A:
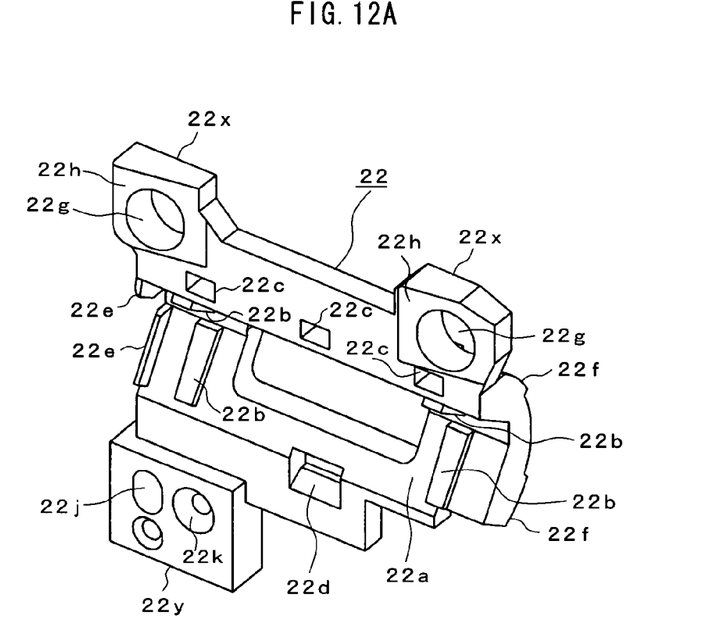
FIG. 12 is a perspective view of the base.
Figure 12B:
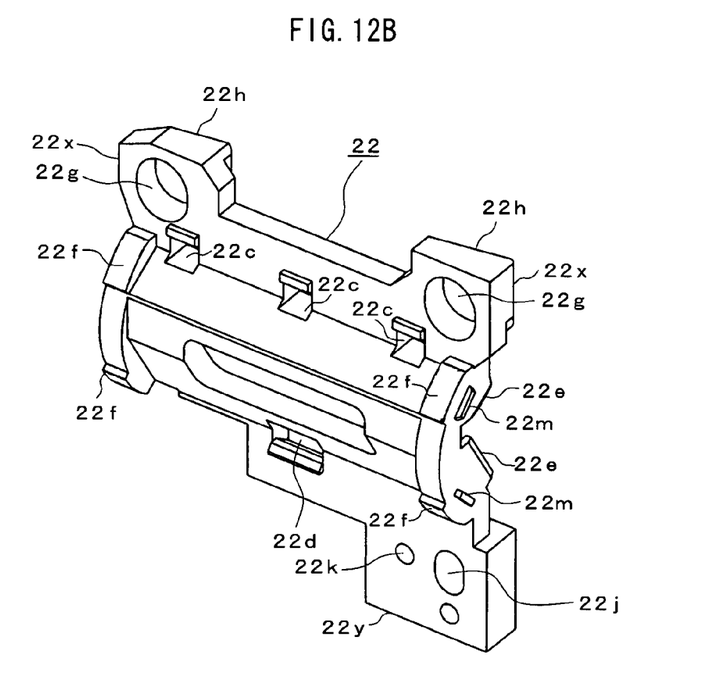

The base 22 is made of metal and is formed into a shape such as shown in FIG. 12A and FIG. 12B. As shown in FIG. 12A, a substantially V-shaped groove 22a is formed across the longitudinal direction of the base 22 at the center on one surface side of the base 22. Projection type supporting parts 22b, 22e for supporting the light tunnel 7 are formed on the inner side of the groove 22a. As shown in FIG. 12B, a convex part 22m is formed on the side surface of the base 22 on the supporting part 22e side. Holes 22c, 22d for inserting the hook parts 21c, 21d of the fixture 21 are formed on both sides of the groove 22a. The light tunnel 7 is fitted into the groove 22a of the base 22, and the side surface of the light tunnel 7 is supported at the supporting part 22b and the end of the exit port 7b side is supported at the supporting part 22e, and thereafter, the hook parts 21c, 21d of the fixture 21 are inserted to the holes 22c, 22d of the base 22, respectively, whereby the hook parts 21c, 21d elastically deform to be hooked at the edge of the holes 22c, 22d, and the fixture 21 is attached to the base 22, as shown in FIG. 4 and FIGS. 8A, 8B. FIG. 8A and FIG. 8B show a state in which the assembling component 20 is seen from the opening 21a side of the fixture 21. In this state, the light tunnel 7 is fixed to the base 22 while being supported by the pressing part 21b and the front surface of the fixture 21 and the supporting parts 22b, 22e of the base 22, and the incident port 7a and the exit port 7b of the light tunnel 7 and the opening 21a of the fixture 21 are lined in the axial direction of the light tunnel 7, as shown with a dot-dash line in FIG. 4.

As shown in FIGS. 12A and 12B, the center on the other surface side of the base 22 is projected across the longitudinal direction of the base 22 to form the bottom of the groove 22a, and an engaging part 22f of circular arc shape is formed at both ends at the distal end. The center of the circular arc of the engaging part 22f is set so as to substantially coincide with the axis (dot-dash line of FIG. 4) of the light tunnel 7 fixed to the base 22. Holes 22g, through which two pins 23 are passed respectively, are each formed at one end 22x of the base 22 in a direction perpendicular to the axis of the light tunnel 7 in FIG. 4. An inclined surface 22h is formed around each hole 22g so as to incline while rising in the axial direction from the incident port 7a towards the exit port 7b of the light tunnel 7. The coil spring 24 is arranged around each pin 23 so as to contact the inclined surface 22h. The diameter of each hole 22g of the base 22 is larger than the diameter of the middle part 23b of each pin 23, and is smaller than the diameter of each coil spring 24. A cross-shaped groove is formed at the head 23a of each pin 23, and a collar 23c is arranged immediately under the head 23a. The diameter of each collar 23c is larger than the diameter of each coil spring 24. A screw part 23d having a diameter smaller than the middle part 23b is formed at the lower part of each pin 23.

A hole 22j (FIGS. 12A, 12B) for passing one machine screw 25 and a hole 22k for screw fitting one screw 26 are formed at the other end 22y of the base 22 in a direction perpendicular to the axis of the light tunnel 7 in FIG. 4. The diameter of the hole 22j is larger than the diameter of the screw part 25d of the machine screw 25, and smaller than the diameter of the head 25a. The diameter of the head 26a of the screw 26 is substantially the same as the diameter of the screw part 26d at the middle. A tapered inclined part 26b is formed at the distal end of the screw 26.

Figure 3:
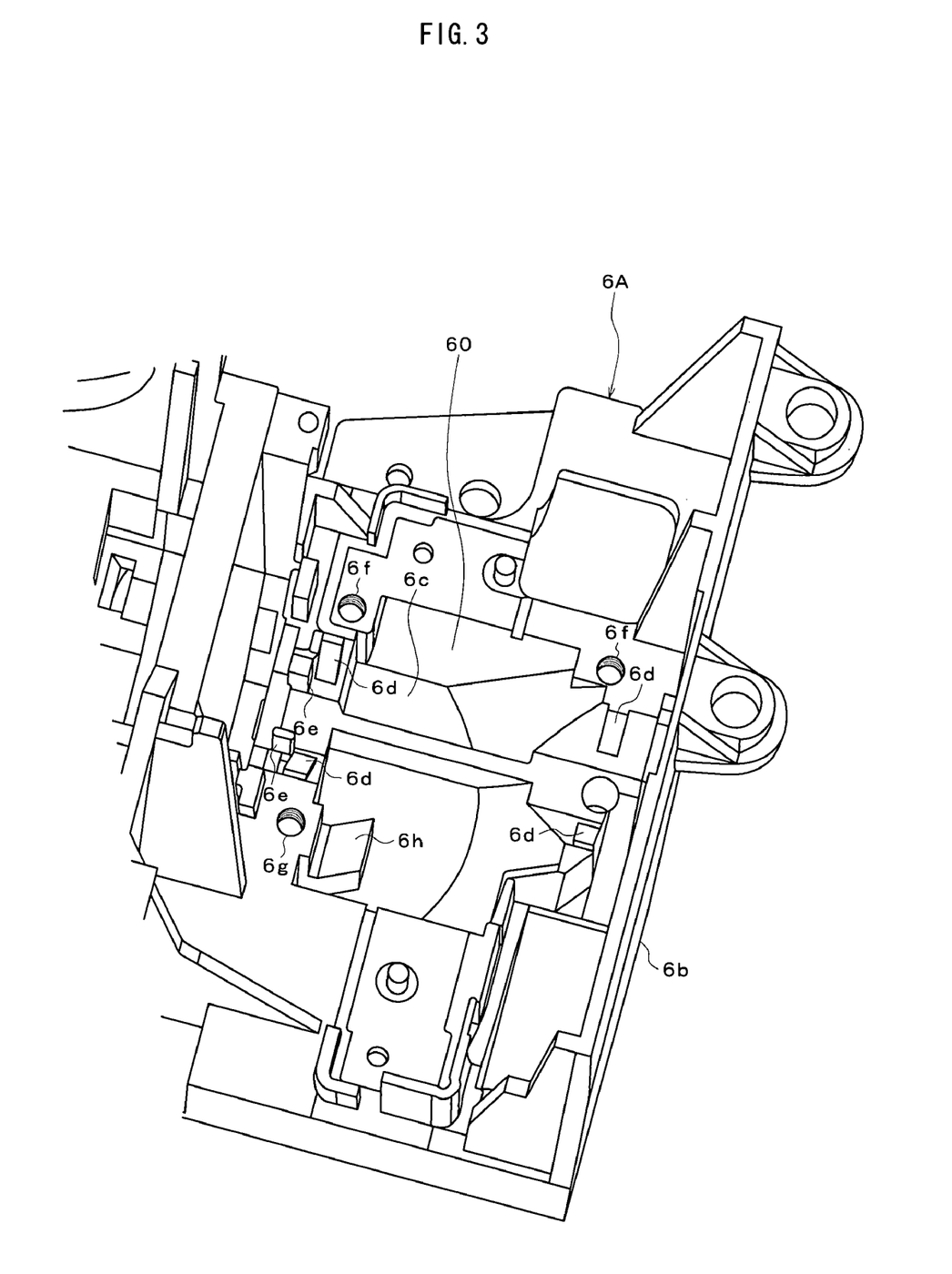
FIG. 3 is an enlarged view of the main parts of the lower side frame.
Figure 6:
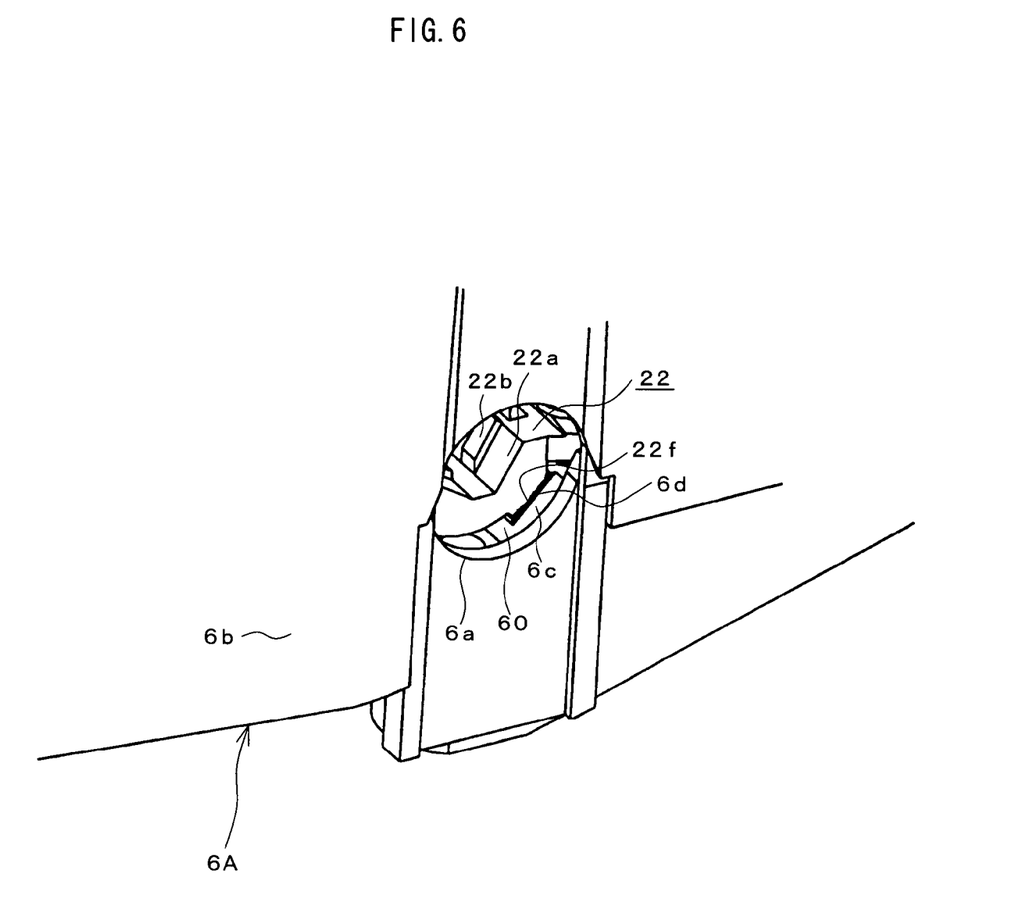
FIG. 6 is a perspective view showing the side surface of the lower side frame.

FIG. 3 is an enlarged view of the assembling part 60 of the lower side frame 6A. An opening 6a is formed in the side surface 6b on the right side of the assembling part 60 of the lower side frame 6A so as to face the assembling part 60, as shown in FIG. 6. The color filter 5 and the lamp case 2 are arranged on the external side (right side in FIG. 2 and FIG. 3) of the side surface 6b, as shown in FIG. 1. In the arrangement state of FIG. 1, the opening 6a of the lower side frame 6A and the opening 2a of the lamp case 2 are lined in the optical axis direction of the light emitted from the lamp 3.

Figure 5:
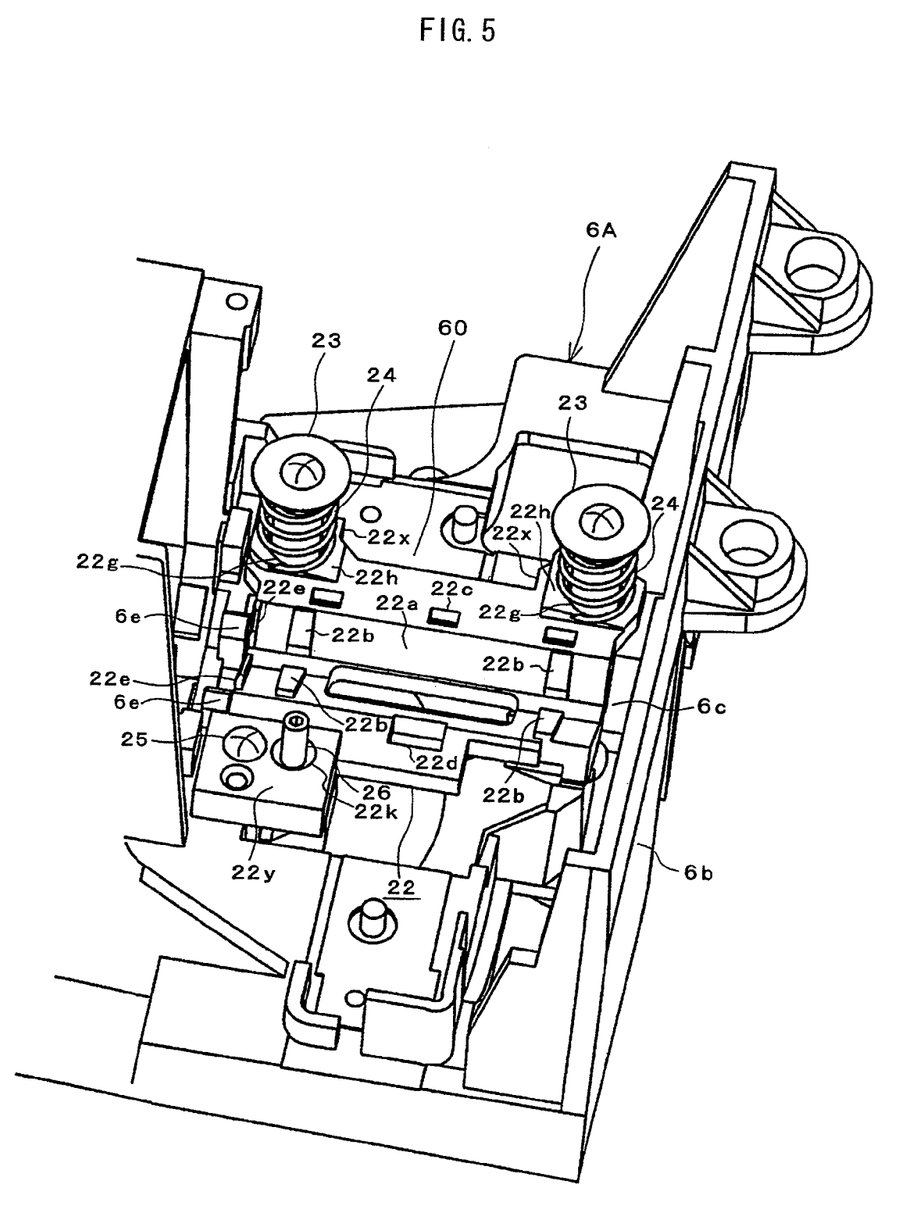
FIG. 5 is a view showing the attachment state of the assembling components with respect to the lower side frame.

A dent 6c is formed in the assembling part 60. A supporting part 6d in the form of inclined surface and a side wall 6e are formed on the inner side of the dent 6c so that the light emitted from the lamp 3 and passed through the openings 2a, 6a is not shielded from entering the mirror 8 assembled to the assembling part 62, as shown in FIG. 1 to FIG. 3 and FIG. 6. The base 22 is fitted to the dent 6c, as shown in FIG. 5. When the base 22 is fitted to the dent 6c as shown in FIG. 5 with the light tunnel 7 fixed to the base 22 by means of the fixture 21, as shown in FIG. 4, the incident port 7a of the light tunnel 7 faces the lamp 3, and the exit port 7b faces the mirror 8 of the assembling part 62, so the axis of the light tunnel 7 substantially coincide with the optical axis of the light from the lamp 3, whereby the light from the lamp 3 passes through the light tunnel 7 and becomes able to enter the mirror 8, as shown in FIG. 1. Furthermore, the engaging part 22f of the base 22 is supported by the supporting part 6d on the inner side of the dent 6c as shown in FIG. 8A and FIG. 8B, so that the base 22 becomes rotatable with the axis of the light tunnel 7 as substantially the center. In FIG. 8A and FIG. 8B, the cross mark indicated on the inner side of the opening 21a of the fixture 21 and the inner side of the incident port 7a of the light tunnel 7 is the axis of the light tunnel 7 and is the center of rotation of the base 22.

A screw hole 6f for screw fitting the screw part 23d of the pin 23 and a screw hole 6g for screw fitting the screw part 25d of the machine screw 25 are formed on the upper part of the dent 6c, as shown in FIG. 3. An inclined surface 6h that engages the inclined part 26b of the distal end of the screw 26 is formed in the vicinity of the screw hole 6g. The inclined surface 6h is formed so as to incline while rising in the optical axis direction of the light of the lamp 3 from the side wall 6e towards the opening 6a, that is, in the axial direction from the exit port 7b towards the incident port 7a of the light tunnel 7 fixed to the base 22 in the state of FIG. 5.

Figure 7:
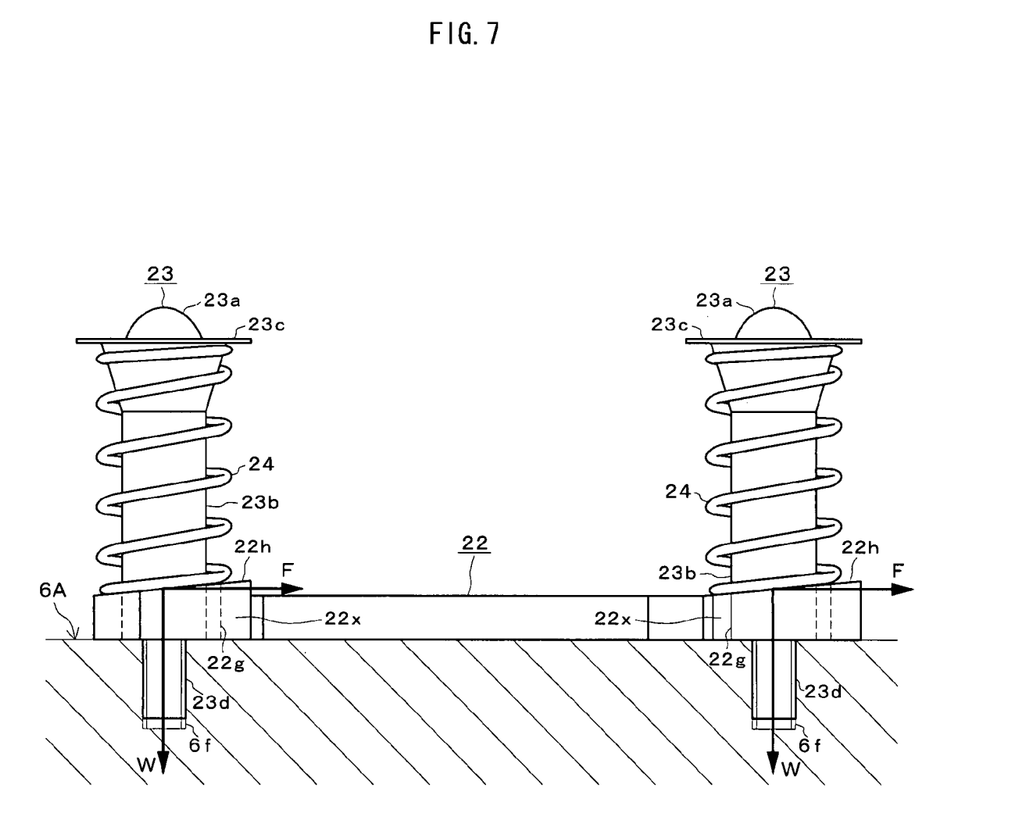
FIG. 7 is a view showing the attachment state of one end of a base with respect to the lower side frame.

In the above configuration, in order to assemble the light tunnel 7 to the lower side frame 6A, the light tunnel 7 is first fitted to the groove 22a of the base 22, as described above, and fixed with the fixture 21, as shown in FIG. 4. The base 22 is then fitted to the dent 6c of the assembling part 60 of the lower side frame 6A and the engaging part 22f is supported by the supporting part 6d. The coil spring 24 is then arranged around the middle part 23b of each pin 23, the screw part 23d and the middle part 23b are passed through the hole 22g at the end 22x of the base 22, as shown in FIG. 4, and the screw part 23d is screwed into each screw hole 6*f* using a screwdriver and the like to attach each pin 23 to the lower side frame 6A, as shown in FIG. 7. In FIG. 7, the illustration of the light tunnel 7 and the fixture 21 is omitted.

When each pin 23 is attached to the lower side frame 6A as described above, the end 22*x* of the base 22 is supported by each pin 23 swingably. Furthermore, each coil spring 24 contacts each inclined surface 22*h* of the base 22, whereby the force F acting towards the side wall 6*e* side of the lower side frame 6A is applied to each inclined surface 22*h*, the end 22*x* of the base 22 is moved towards the side wall 6*e*, and the side wall of each hole 22*g* is pushed against the middle part 23*b* of each pin 23. Furthermore, the force W acting towards the supporting part 6*d* side of the lower side frame 6A is applied from each coil spring 24 to each inclined surface 22*h*, whereby the base 22 rotates in the clockwise direction with the axis of the light tunnel 7 as substantially the center, as shown in FIG. 8A, and the end 22*y* rises from the lower side frame 6A with respect to the end 22*x*. In this state, the end 22*x* of the base 22 is held at a plural points by two pins 23, two coil springs 24, and the lower side frame 6A, and thus shake of the base 22 is suppressed, whereby subsequent attachment work is facilitated.

Next, the screw 25 is passed through the hole 22*j* at the end 22*y* of the base 22, and screwed into the screw hole 6*g* of the lower side frame 6A using the screwdriver and the like. The end 22*y* of the base 22 is then pushed against the supporting part 6*d* side of the lower side frame 6A with the head 25*a* of the screw 25, whereby the base 22 rotates in the counterclockwise direction with the axis of the light tunnel 7 as substantially the center, as shown in FIG. 8B. Thus, the distance between the ends 22*x*, 22*y* of the base 22 and the lower side frame 6A can be changed by changing the screw-fit depth of the screw 25 with respect to the screw hole 6*g* of the lower side frame 6A, and the rotation angle of the light tunnel 7 is adjusted with the base 22. In this state, the base 22 is supported from both upper and lower surfaces by the coil spring 24, the screw 25, and the lower side frame 6A, and thus the shake in the rotating direction of the base 22 and the light tunnel 7 is suppressed, and subsequent attachment work is facilitated.

Figure 9:
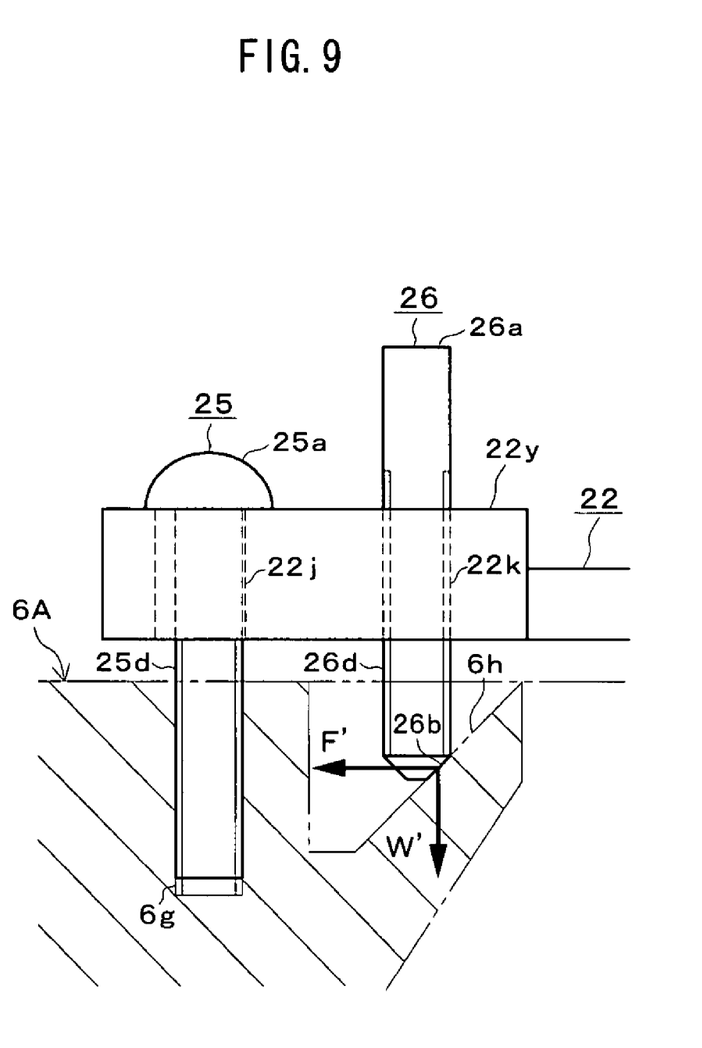
FIG. 9 is a view showing the attachment state of the other end of the base with respect to the lower side frame.

Next, the screw 26 is screwed into the screw hole 22*k* of the end 22*y* of the base 22 using a wrench and the like, whereby the inclined part 26*b* of the distal end of the screw 26 smoothly engages the inclined surface 6*h* of the lower side frame 6A, as shown in FIG. 9. FIG. 9 shows only the vicinity of the end 22*y* of the base 22. When the inclined part 26*b* of the screw 26 engages the inclined surface 6*h* of the lower side frame 6A, the force W' acting towards the supporting part 6*d* side of the lower side frame 6A is applied to the inclined surface 6*h* from the inclined part 26*b*, and the force F' acting towards the side wall 6*e* of the lower side frame 6A is applied to the inclined part 26*b* from the inclined surface 6*h* as one component of reactive force. The base 22 is thereby moved towards the side wall 6*e*, the convex part 22*m* (FIG. 12B) of the base 22 is pressed against the side wall 6, and the base 22 and the light tunnel 7 are fixed to the lower side frame 6A without shaking in the axial direction and the rotating direction. The fixed state of the base 22 at this point is the same as the state shown in FIG. 5. In FIG. 5, the illustration of the light tunnel 7 and the fixture 21 is omitted. When fixed in the above manner, the shake in the axial direction and the rotating direction of the base 22 and the light tunnel 7 are almost completely suppressed and a stable fixed state can be maintained since the base 22 is supported at both upper and lower surfaces and both ends 22*x*, 22*y* with forces W, W', F, F' etc. by the coil spring 24, the screw 25, the screw 26, and the lower side frame 6A.

After the other components 8 to 11 of the image projection optical system are assembled to other assembling parts 61 to 64 of the lower side frame 6A, the upper side frame is fitted to the lower side frame 6A to assemble the engine casting 6, and the engine casting 6 is installed in the main body 1 of the projector 100 as shown in FIG. 1. In such installation state, the light emitted from the lamp 3 passes through the opening 2*a* of the lamp case 2, the color wheel 5, and the opening 6*a* of the engine casting 6, enters the light tunnel 7, and then condensed and uniformed in the light tunnel 7. The light which exit from the light tunnel 7 is reflected by the mirror 8, passed through the relay lens 9, and irradiated onto the DMD 10. Furthermore, the image is formed at the DMD 10 by ON/OFF operating each micro-mirror of the DMD 10, and the image is projected onto the screen 50 through the projection lens 11.

Figure 13:
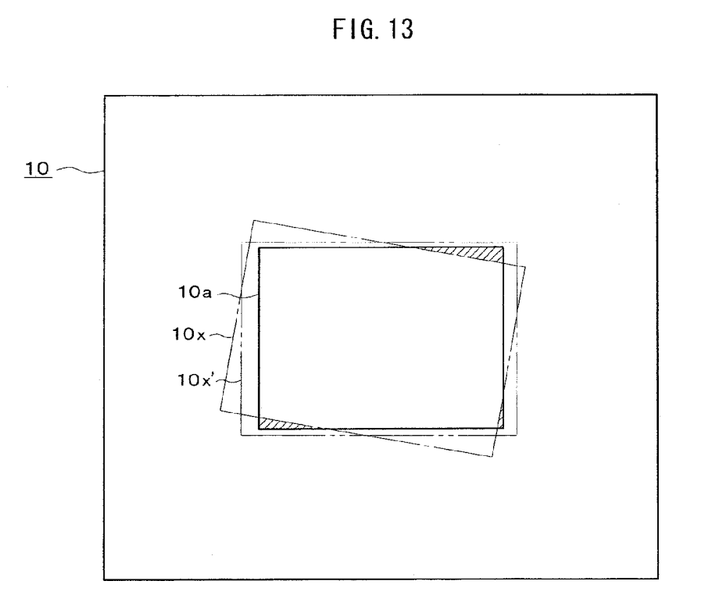
FIG. 13 is a view showing the irradiating state of light on a DMD according to the present invention.

FIG. 13 is a view showing the irradiation state of the light on the DMD 10 of the projector 100 of the present embodiment installed with each component as described above. The rectangular shape 10*a* shown with a solid line is the image forming surface of the DMD 10 arranged on the side irradiated with the light. The image forming surface 10*a* consists of above-described micro-mirrors, and is covered with a cover glass (not shown). 10*x* shown with a dot-dash line is the irradiating region of the light of before adjustment that is irradiated on the DMD 10. That is, the irradiating region 10*x* is one example of the irradiating region of the light irradiated on the DMD 10 when the light tunnel 7 and the like are vaguely attached to the lower side frame 6A without performing rotation adjustment. The irradiating region 10*x* is a square shape slanted and slightly deformed with respect to the image forming surface 10*a*, and thus the light is not irradiated to one part, as indicated by the shaded area, of the image forming surface 10*a*.

The upper side frame of the engine casting 6 is detached from the lower side frame 6A, and the tightening degree of the screw 26, the screw 25 and the like (pin 23 in some cases) assembled to the assembling part 60 is changed to adjust the rotation angle of the light tunnel 7 with the whole base 22, thereby rotating the irradiating region 10*x* of the light on the DMD 10 of FIG. 13 and changing the tilt or position as in the irradiating region 10*x*' shown with a dot-dot-dash line so that the light can be irradiated on the entire image forming surface 10*a*. Furthermore, by adjusting the rotation angle of the light tunnel 7, and adjusting the attachment angle or position of the mirror 8 with respect to the lower side frame 6A, the adjustable range of the irradiating region of the light on the DMD 10 is extended so that the light can be more reliably irradiated on the entire image forming surface 10*a*.

As a result, the image quality is prevented from degrading such as the projected image from becoming dark when the image formed with the DMD 10 is projected onto the screen 50 through the projection lens 11. The adjustment of the rotation angle of the light tunnel 7 and the adjustment of the irradiating region of the light on the DMD 10 are easily performed with a simple task such as tightening the screw 26, the screw 25 etc., and thus the working time can be shortened. Furthermore, the optical specification is not changed since the size of the light tunnel 7 does not need to be changed as in the prior art, and thus the trouble of redesigning the image projection optical system, and the cost for preparing the light tunnel 7 of different sizes etc. can be saved. Moreover, the adjustment of the irradiating region of the light on the DMD 10 can be appropriately performed even by using the same type of light tunnel 7 in different types of projector 100, thereby standardizing the components, and further reducing the cost.

The present invention may adopt various forms other than the above described embodiment. For instance, an example in which one end 22x of the base 22 is supported swingably using two pins 23 has been described in the above embodiment, but the present invention is not limited thereto. One end 22x of the base 22 may be supported using one or three or more pins.

Also, an example in which one end 22x of the base 22 is pressed towards the supporting part 6d side of the lower side frame 6A using two coil springs 24 has been described in the above embodiment, but the present invention is not limited thereto. One end 22x of the base 22 may be pressed using one or three or more of other types of spring such as blade spring.

Furthermore, an example in which the present invention is applied to the projector 100 has been described in the above embodiment, but the present invention is also applicable to projection apparatus such as DLP type rear projection television, for example.

What is claimed is:

1. A projection apparatus comprising:
    a light tunnel of square tube shape configured to pass light emitted from a light source and change the light to condensed uniform light;
    a mirror configured to reflect the light passed through the light tunnel;
    a DMD (Digital Micro-mirror Device) configured to reflect the light at an image forming surface irradiated with the light reflected by the mirror and form an image;
    a lens configured to project the image formed with the DMD;
    a frame on which the light tunnel, the mirror, the DMD, and the lens are supported; and
    a rotation adjustment fixing mechanism comprising:
        a base rotatably supported on a supporting part formed on the frame at one surface side of the base so that, when an incident port of the light tunnel faces the light source and an exit port faces the mirror, a rotation axis of the base is aligned with a central axis of the light tunnel, the light tunnel being fixed at an opposite surface side at the center of the base with a fixture;
        a plurality of pins configured to swingably support one end of the base, each of the plurality of pins being passed through a plurality of holes formed at the one end of the base in a direction perpendicular to the central axis of the light tunnel and attached to the frame;
        a spring arranged around each pin and configured to press an inclined surface of the base formed so as to incline in an axial direction of the light tunnel around each hole of the base towards the supporting part side of the frame;
        a first screw passed through a hole formed on the other end of the base in a direction perpendicular to the central axis of the light tunnel and screwed into a screw hole formed on the frame, the first screw being configured to press the other end of the base towards the supporting part of the frame with a head; and
        a second screw screwed into a screw hole formed on the other end of the base to be passed through the base so that an inclined part formed at a distal end of the second screw engages with an inclined surface formed on the frame, the inclined part formed at the distal end of the second screw being parallel to the inclined surface of the frame, and the second screw being configured to press the base against a side wall of the frame in the axial direction of the light tunnel, wherein
    the rotation adjustment fixing mechanism adjusts a rotation angle of the base and fixes the light tunnel to the frame by changing the screw-fit depth of the first screw with respect to the screw hole of the frame and screwing the second screw into the screw hole of the base so as to engage with the inclined surface of the frame.

2. A projection apparatus comprising,
    a light tunnel configured to pass light emitted from a light source and change the light to condensed uniform light;
    a mirror configured to reflect the light passed through the light tunnel;
    an image forming device configured to reflect the light at an image forming surface irradiated with the light reflected by the mirror and form an image;
    a lens configured to project the image formed with the image forming device;
    a frame on which the light tunnel, the mirror, the image forming device, and the lens are supported; and
    a rotation adjustment fixing mechanism configured to adjust a rotation angle of the light tunnel and fix the light tunnel to the frame while an incident port of the light tunnel faces the light source and an exit port faces the mirror,
    wherein the rotation adjustment fixing mechanism comprises:
        a base rotatably supported on a supporting part formed on the frame at one surface side of the base with the incident port of light of the light tunnel facing the light source and the exit port facing the mirror, the light tunnel being fixed at an opposite surface side at the center of the base with a fixture;
        a pin configured to swingably support one end of the base, the pin being passed through a hole formed at the one end of the base in a direction perpendicular to a central axis of the light tunnel and attached to the frame;
        a spring configured to bias the one end of the base towards the supporting part of the frame;
        a first screw passed through a hole formed on the other end of the base in a direction perpendicular to the central axis of the light tunnel and screwed into a screw hole formed on the frame, the first screw being configured to press the other end of the base towards the supporting part of the frame with a head; and
        a second screw screwed into a screw hole formed on the base to pass through the base and engage with an inclined surface formed on the frame so as to incline in an axial direction of the light tunnel, the second screw being configured to press the base against a side wall of the frame in the axial direction of the light tunnel.

3. The projection apparatus according to claim 2, wherein the spring contacts one surface of the base and presses the one end towards the supporting part of the frame, and an inclined surface is formed at the area contacting the spring of the base so that the inclined surface inclines in an opposite direction to the inclined surface of the frame.

* * * * *